United States Patent
Khurana et al.

(10) Patent No.: US 10,581,695 B2
(45) Date of Patent: Mar. 3, 2020

(54) TEST SYSTEM AND METHOD FOR BENCHMARK TESTING A DEVICE UNDER TEST

(71) Applicant: Rohde & Schwarz GmbH & Co. KG, Munich (DE)

(72) Inventors: Hanush Khurana, Singapore (SG); Rajashekar Durai, Singapore (SG); Prabhakaran Ekambaram, Singapore (SG)

(73) Assignee: Rohde & Schwarz GmbH & Co. KG, Munich (DE)

( * ) Notice: Subject to any disclaimer, the term of this patent is extended or adjusted under 35 U.S.C. 154(b) by 281 days.

(21) Appl. No.: 15/487,864

(22) Filed: Apr. 14, 2017

(65) Prior Publication Data
US 2018/0302292 A1  Oct. 18, 2018

(51) Int. Cl.
*G06F 15/16* (2006.01)
*H04L 12/24* (2006.01)
*H04L 12/26* (2006.01)

(52) U.S. Cl.
CPC .......... *H04L 41/145* (2013.01); *H04L 43/50* (2013.01); *H04L 41/0816* (2013.01)

(58) Field of Classification Search
CPC ... H04L 29/08072; H04L 29/06; H04L 65/40; H04L 41/0816
USPC .................. 709/220, 224, 228, 226, 232
See application file for complete search history.

(56) References Cited

U.S. PATENT DOCUMENTS

| 5,790,425 | A * | 8/1998 | Wagle ................ G06F 11/3428 709/218 |
| 9,148,293 | B2 * | 9/2015 | McFate ................ G06F 9/5027 |
| 9,661,038 | B2 * | 5/2017 | Cetin ...................... H04L 65/40 |
| 9,924,386 | B2 * | 3/2018 | Jain ...................... H04W 24/02 |
| 10,067,780 | B2 * | 9/2018 | Chang ...................... H04L 67/10 |
| 10,178,073 | B2 * | 1/2019 | Shaposhnik ........ G06F 9/45545 |
| 2006/0230317 | A1 * | 10/2006 | Anderson ........... G06F 11/3428 714/38.13 |
| 2009/0156198 | A1 * | 6/2009 | Lee ........................ H04W 24/08 455/425 |
| 2011/0158244 | A1 * | 6/2011 | Long ...................... H04L 12/66 370/401 |
| 2013/0132565 | A1 * | 5/2013 | Cetin ...................... H04L 65/40 709/224 |
| 2014/0157370 | A1 * | 6/2014 | Plattner ............... G06F 21/6245 726/4 |

(Continued)

FOREIGN PATENT DOCUMENTS

CN  105372468 A  3/2016

*Primary Examiner* — Khanh Q Dinh
(74) *Attorney, Agent, or Firm* — Christensen O'Connor Johnson Kindness PLLC

(57) ABSTRACT

A test system for benchmark testing a device under test is described. The test system comprises a device under test having hardware components, an operating system and at least one over-the-top traffic unit. The test system also has at least one network unit providing a network for the benchmark testing. The test system further comprises at least one control unit controlling the benchmark testing. In addition, the test system has at least one measurement unit configured to acquire benchmark data of the device under test. The control unit is configured to control the measurement unit and the over-the-top traffic unit. Further, a method for benchmark testing a device under test is described.

17 Claims, 1 Drawing Sheet

(56) References Cited

U.S. PATENT DOCUMENTS

2018/0020029 A1\* 1/2018 Cetin .................. H04L 65/40

\* cited by examiner

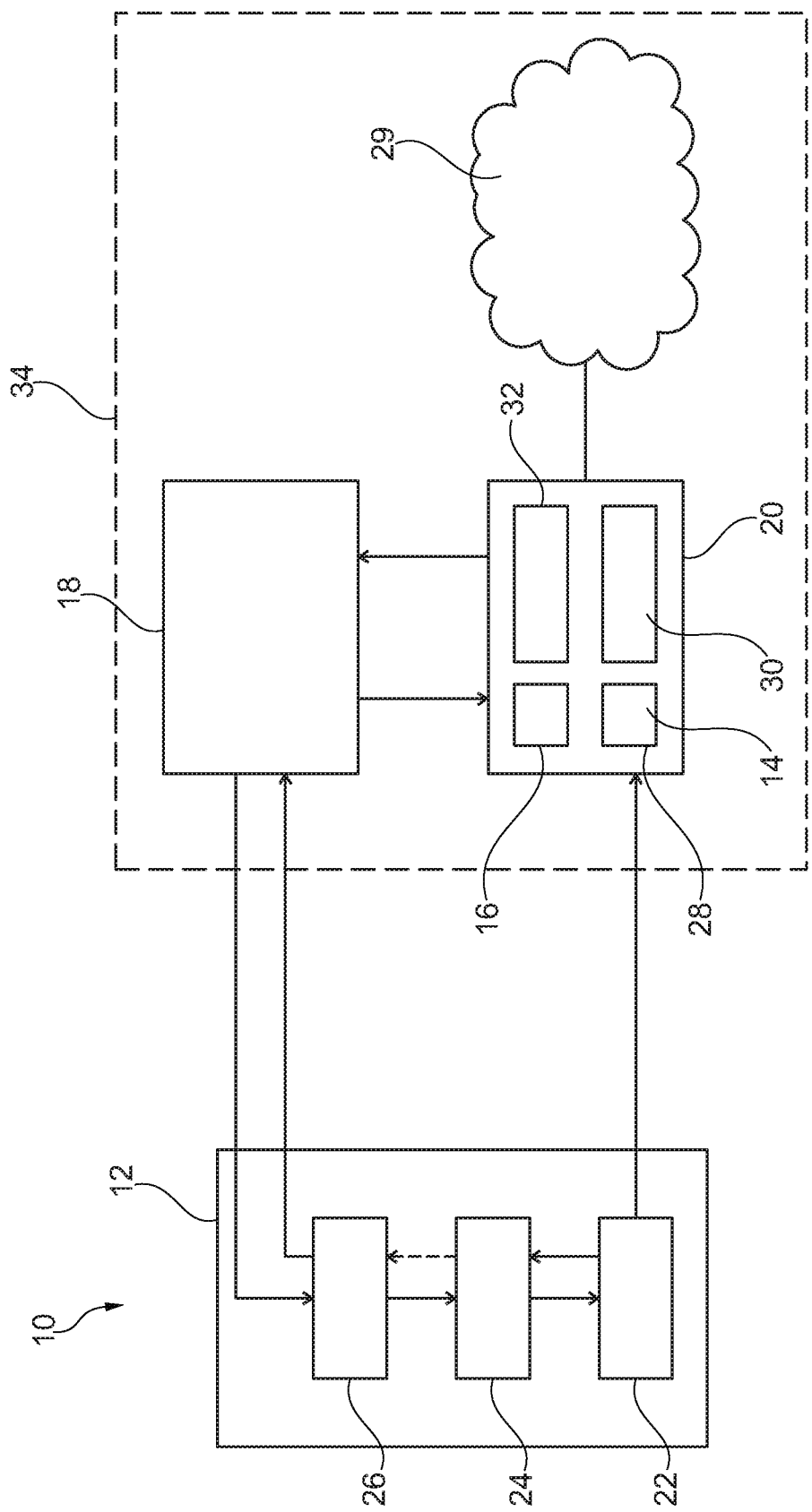

TEST SYSTEM AND METHOD FOR BENCHMARK TESTING A DEVICE UNDER TEST

FIELD OF THE DISCLOSURE

Embodiments of the present disclosure relate generally to a test system for benchmark testing a device under test as well as a method for benchmark testing a device under test.

BACKGROUND

Test systems for benchmark testing a device under test such as a mobile device, for instance a mobile phone, are known in the state of the art. Typically, several different tests are performed and estimations are done based on the tests performed, in particular the test results obtained. In fact, the hardware of the mobile phone is tested during an offline test wherein the operating system that is used on the mobile phone is also tested offline separately. Afterwards, both offline tests are combined in order to estimate the benchmark of the mobile device, for instance a mobile phone, having the operating system running that has been tested separately.

In addition, the performance of the mobile device is estimated having the operating system tested running. Particularly, the performance of the device under test in a wireless network environment is estimated under the condition that an over-the-top traffic application is used for transmitting video and/or audio data directly without any internet service provider. Accordingly, the over-the-top behavior of the device under test is estimated based on the test results relating to the hardware components of the device under test and the operating system.

Thus, the benchmark testings known in the state of the art are merely based on estimations related to several tests performed separately.

Accordingly, there is a need for a benchmark testing having a higher reliability with regard to the benchmark of the device under test, in particular with regard to the over-the-top behavior.

SUMMARY

Embodiments of the present disclosure provide a test system for benchmark testing a device under test, the test system comprising:

a device under test having hardware components, an operating system and at least one over-the-top traffic unit;

at least one network unit providing a network for the benchmark testing;

at least one control unit controlling the benchmark testing; and at least one measurement unit configured to acquire benchmark data of the device under test, the control unit being configured to control the measurement unit and the over-the-top traffic unit.

Embodiments of the present disclosure further provide a method for benchmark testing a device under test, with the following steps:

providing a device under test having hardware components, an operating system and at least one over-the-top traffic unit;

providing a network for the benchmark testing by using at least one network unit;

controlling the over-the-top traffic unit and the network unit by using a control unit; and measuring benchmark data by using a measurement unit.

Embodiments of the present disclosure are based on the finding that the whole system, in particular the hardware components, the operating system and the at least one over-the-top traffic unit, is tested simultaneously in order to identify the best working combination of hardware components and operating system with regard to the over-the-top behavior of the device under test by using the over-the-top traffic unit. Accordingly, an easy possibility is provided to benchmark the device under test, for instance a mobile device such as a mobile phone, with regard to the best combination being capable of handling over-the-top traffic applications being used on the device under test. The best combination relates to the hardware components of the device under test as well as the operating system running on the device under test.

The network unit, the control unit and the benchmark unit may establish a performance quality analysis system for over-the-top content.

According to an aspect of the present disclosure, the over-the-top traffic unit comprises at least one of an over-the-top traffic simulation component and an over-the-top traffic application generating traffic. The over-the-top traffic simulation component may be configured to simulate the traffic of a certain over-the-top traffic application that is simulated appropriately. Accordingly, the over-the-top traffic simulation component can simulate different over-the-top traffic applications in order to determine the over-the-top behavior of the device under test for different over-the-top traffic applications, in particular those ones typically used. Generally, the over-the-top traffic unit may be configured to provide an over-the-top traffic application (also a simulated one) being used for benchmark testing the device under test with regard to its handling behavior of an over-the-top traffic application, in particular the handling of the over-the-top content. Alternatively, the over-the-top traffic unit comprises an over-the-top traffic application generating traffic related to the over-the-top content wherein the over-the-top traffic application is used on the device under test, for instance a certain testing application provided by a service provider. Thus, the over-the-top traffic unit may be a separately formed testing application that has access to the operating system and the hardware components in order to combine the different aspects for benchmark testing.

The over-the-top traffic unit may further be configured to simulate an input of an over-the-top traffic application, in particular the incoming traffic. Accordingly, the control unit is configured to control the simulation of the over-the-top traffic application, in particular its input.

The over-the-top traffic unit can further be configured to simulate an output of an over-the-top traffic application, in particular the outgoing traffic. Accordingly, the control unit is configured to control the simulation of the over-the-top traffic application, in particular its output.

For instance, the over-the-top traffic simulation component simulates the input and the output. Thus, a realistic simulation of an over-the-top traffic application is obtained, in particular with regard to the traffics.

In general, the over-the-top traffic unit may only simulate or generate the traffic related to an over-the-top traffic application. For benchmark testing the device under test, the occurring traffic of an over-the-top traffic application being used by the device under test is of interest.

According to another aspect of the disclosure, the over-the-top traffic unit is configured to interact with the operating system such that data is transmitted in a controlled manner. For instance, the over-the-top traffic unit controls the operating system wherein the operating system is controlled such that the operating system attempts to send data (packages) periodically. The appropriate control signals are output by the over-the-top traffic unit, in particular the separately formed testing application defining the over-the-top traffic unit. Thus, the over-the-top traffic unit triggers the operating system appropriately. Furthermore, the interaction may be bidirectional such that the operating system also transmits signals in a controlled manner, in particular periodically, wherein these signals are received by the over-the-top traffic unit.

Further, the network unit may be configured to provide a wireless network. Accordingly, the device under test is tested in a wireless network environment during the benchmark testing.

In some embodiments, the network unit is connected to the internet. Therefore, the benchmark testing can be performed under realistic conditions. In addition, the network unit may obtain information during the benchmark testing.

Furthermore, the network unit may be a network simulation unit such that the network provided is a simulated one. Thus, the network may be simulated by the at least one network unit. The benchmark testing can be performed in a laboratory environment ensuring similar conditions for different benchmark testings in order to attain reliable results for different benchmark testings. Thus, the different benchmark testing results can be compared with each other in order to identify the combination having the best over-the-top behavior.

According to a certain embodiment, the device under test is configured to be operated by another operating system such that the operating system is exchangeable. Therefore, the device under test, in particular its hardware components, can be tested with different operating systems in order to identify the best combination with regard to the hardware components and the operating system running on the device under test.

In addition, the hardware components may be exchangeable. Thus, the hardware components can also be changed for different benchmark testings in order to identify the best combination with regard to the hardware components. For instance, hardware components being exchanged relate to signal transmission components, for instance antennas, and processing units that have an influence on the over-the-top behavior of the device under test.

According to another aspect of the disclosure, the test system comprises an analyzing unit being configured to analyze the benchmark data acquired by the measurement unit. Thus, the benchmark data measured can be analyzed by an analyzing unit that identifies at least one of separate traffic, communication pattern and communication pattern in one identified traffic. Accordingly, analyses can be done on the benchmark data acquired in order to analyze and identify the best combination with regard to the over-the-top behavior of the device under test automatically, in particular the best combination of the hardware components and the operating system running on the device under test. Particularly, the over-the-top traffic application performance based on the hardware components and operating system used can be analyzed appropriately.

In some embodiments, the analyzing unit is configured to identify at least one of a separate traffic, a communication pattern and a communication pattern in one identified traffic. Thus, the analyzing unit may identify separate traffics caused by the over-the-top traffic application, for instance the simulated one. In addition, the analyzing unit may identify a certain communication pattern that occurs during the benchmark testing, in particular in the traffic of the (simulated) over-the-top traffic application. Accordingly, the analyzing unit is also configured to analyze a certain communication pattern in an identified traffic, particularly an identified separate application traffic. These different issues that can be identified by the analyzing unit are used for identifying the best combination of hardware components and operating system with regard to the over-the-top traffic application (being simulated). Therefore, the over-the-top behavior can be analyzed appropriately. For instance, the identified traffic corresponds to the ingoing traffic of the (simulated) over-the-top traffic application and/or the outgoing traffic of the (simulated) over-the-top traffic application. In addition, communication patterns may be identified in those traffics.

The benchmark data acquired may comprise at least one of over-the-top performance data, hardware performance data and operating system performance data. The user is enabled to investigate the different performance data in more detail being results of the benchmark testing. Therefore, the best combination of hardware components and operating system with regard to the over-the-top behavior can be selected easily. In addition, certain compromise solutions can be revealed due to the fact that the several performance data are gathered simultaneously. Thus, the user can decide to use a device under test having a better performance data with regard to the hardware.

Results obtained during benchmark testing may be provided, the results comprising at least one of over-the-top performance data, hardware performance data and operating system performance data. These results may relate to the benchmark data acquired or any results obtained by the analyzing unit.

According to another aspect of the disclosure, the test system comprises at least on indication unit being configured to provide results obtained during benchmark testing. The indication unit is used to present the results obtained to the user of the test system. Thus, the user can identify certain issues directly by taking the results into account that are shown by the indication unit. The results provided may be based on the measurement data acquired, for instance the benchmark data acquired. Alternatively or supplementary, the indication unit is configured to provide the results of the analyzing unit. Then, the user can directly investigate the outcome of the analyses.

The indication unit may comprise a display that is configured to display over-the-top performance data, hardware performance data and operating system performance data. As the benchmark data acquired may be at least part of the results provided by the indication unit, at least one of over-the-top performance data, hardware performance data and operating system performance data are provided by the indication unit, in particular displayed.

According to a certain embodiment, the device under test is a mobile device. For instance, the mobile device is a mobile phone such as a smart phone that can be used for over-the-top purposes. Alternatively, the mobile device may be a tablet, notebook or any other electronic device being transportable and mobile.

Another aspect provides that at least two of the network unit, the measurement unit and the control unit are established in a common device. For instance, the network unit and the measurement unit are established by a single wideband radio communication radio communication tester.

Several benchmark tests may be performed using different test scenarios, the test scenarios being defined by adapting at least one of the operating system, the hardware components and the controlling of the over-the-top traffic unit. As the hardware components and the operating system are exchangeable, different combinations can be tested wherein the control unit may further be configured to vary the testing conditions appropriately.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawing, wherein The FIGURE shows a schematic overview of a test system for benchmark testing.

DETAILED DESCRIPTION

The detailed description set forth below in connection with the appended drawing, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In the following description, numerous specific details are set forth in order to provide a thorough understanding of one or more embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

In the FIGURE, a test system 10 for benchmark testing a device under test is shown that comprises the device under test 12 to be tested, a network unit 14 for providing a network, a measurement unit 16 for acquiring benchmark data of the device under test 12 and a control unit 18 for controlling the benchmark testing, in particular components of the test system 10

In the shown embodiment, the network unit 14 as well as the measurement unit 16 are housed in a common device 20 being a wideband radio communication tester. Alternatively, the network unit 14 and the measurement unit 16 are separately formed.

As shown in the FIGURE, the device under test 12 comprises hardware components 22 as well as an operating system 24 running on the device under test 12 for operating the several hardware components 22. Further, the status of at least some of the hardware components 22 may be sensed and forwarded to the operating system 24 such that a bidirectional communication between the hardware components 22 and the operating system 24 is established that is indicated by the arrows In addition, the device under test 12 has on over-the-top traffic unit 26 that interacts with the operating system 24 as will be described later. The over-the-top traffic unit 26 may be an over-the-top traffic simulation component and/or an over-the-top traffic application itself.

For instance, the over-the-top traffic simulation component is configured to simulate the over-the-top traffic wherein the simulation is controlled by the control unit 18. The over-the-top traffic simulation component may simulate the incoming and/or outgoing traffic of a simulated over-the-top traffic application being used by the device under test 12.

In general, the over-the-top traffic unit 26 can be established by a testing application installed on the device under test 12 wherein the testing application is controlled by the control unit 18 appropriately wherein the testing application controls the operating system 24, in particular by triggering the operating system 24 in a controlled manner.

The testing application may simulate an over-the-top traffic application that will be used by the device under test 12. Alternatively, the testing application is an application that can be used for over-the-top purposes. Thus, the testing application is an over-the-top traffic application generating traffic. Particularly, the testing application can be adapted appropriately.

Accordingly, the over-the-top traffic unit 26 simulates and/or generates over-the-top traffic being used for benchmark testing the device under test 12.

In general, the device under test 12 is configured to be operated by another operating system such that the operating system 24 is exchangeable in order to perform different benchmark testings of the device under test 12 for identifying the best combination with regard to the operating system 24 and the hardware components 22.

For this purpose, the hardware components 22 are also exchangeable such that the same operating system 24 can be tested with different hardware components 22 in order to identify the best over-the-top behavior of the device under test 12. Particularly, certain hardware components 22 are exchanged during the different benchmark tests having an influence on the over-the-top behavior of the device under test 12.

Accordingly, the over-the-top traffic simulation component may simulate the incoming and/or outgoing traffic of a simulated over-the-top traffic application being used by a certain combination of hardware components 22 and operating system 24 depending on the currently chosen ones.

In addition, the (real) over-the-top traffic application, in particular provided by the testing application, generates different traffics while being used with different hardware components 22 and/or operating systems 24.

Generally, the over-the-top traffic unit 26 simulates and/or generates different over-the-top traffic while being used with different combinations of hardware components 22 and operating system 24.

In the shown embodiment, the network unit 14 is a network simulation unit 28 such that the network provided is a simulated wireless network. This ensures to perform the benchmark testings in a wireless network environment such that the device under test 12 can be tested under real conditions. Therefore, the benchmark tests can be performed in a laboratory environment such that different benchmark tests can be done under the same conditions which ensures that the different benchmark testings can be compared with each other in order to identify the best combination of hardware components 22 and operating system 24 with regard to the over-the-top behavior of the device under test 12.

However, the network unit 14 is connected to the internet 29 for ensuring realistic test conditions. Further, the internet connection enables the possibility to retrieve information from the internet during benchmark testing the device under test 12.

In addition, the test system 10 comprises an analyzing unit 30 as well as an indication unit 32 that both are housed in the common device 20 being the wideband radio communication tester. The indication unit 32 may be a display of the common device 20, for instance a touch-sensitive display.

The measuring unit 14 acquires benchmark data of the device under test 12 during the benchmark testings that are forwarded to the analyzing unit 30 for analyzing purposes such that the results provided by the analyzing unit 30 are forwarded to the indication unit 32 that is configured to indicate the results to the user appropriately. Thus, the use of the test system 10 is enabled to analyze the results of the benchmark testings by its own.

The analyzing unit 30 is configured to analyze the benchmark data acquired by the measurement device 14 in order to identify at least one of a separate traffic, a communication pattern and a communication pattern in one identified traffic. Thus, the analyzing unit 30 verifies the benchmark data received with regard to the performance, in particular the communication performance of the important components such as the hardware components 22 and the operating system 24 with regard to the over-the-top behavior. The identified traffic may relate to the (simulated) over-the-top traffic application, in particular the traffic between the (simulated) over-the-top traffic application and the (simulated) network.

Thus, data traffics and communication patterns are investigated and analyzed by the analyzing unit 30, for instance incoming and outgoing traffics.

The indication unit 32 is configured to provide results related to the over-the-top performance, the hardware performance and/or the operating system performance. These different results relating to the benchmark data acquired can be provided to the user via the indication unit 32. These results obtained can inform the user of the test system 10 immediately regarding the best combination used for over-the-top content. In other words, the best combination of hardware components 22 and operating system 24 can be identified with regard to the over-the-top behavior.

In general, the over-the-top traffic unit 26 and the measurement unit 14 are controlled by the control unit 18 during the benchmark testing.

Further, the over-the-top traffic unit 26 is configured to control the operating system 24, for instance by issuing control triggers such that the operating system 24 is triggered by the over-the-top traffic unit 26, The trigger signals control the operating system 24 such that the operating system 24 attempts to send data (packages) or signals in a controlled manner via the hardware components, for instance every 10 milliseconds.

These data (packages) or signals are acquired by the common device 20, in particular the measurement unit 14, wherein benchmark data related to the device under test 12 are acquired. For instance, the measurement unit 14 acquiring the benchmark data identifies the number of Radio Resource Control connections (RRC connections) being a protocol used typically.

The benchmark testing is performed under different conditions, for instance changing control trigger intervals, alternative operating systems 24 and/or alternative hardware components 22. Hence, this enables to identify the best combination of the operating system 24 and the hardware components 22 with regard to the over-the-top behavior of the device under test 12.

These different conditions applied relate to different testing scenarios.

The control unit 18 and the common device 20 may establish a performance quality analysis system 34 for over-the-top content.

A test system 10 and a method for benchmark testing a device under test 12 are provided that generate test results being reliable with regard to the over-the-top behavior of the device under test 12. This can be ensured as the several components having an influence on the over-the-top behavior are tested simultaneously.

Further, the test system 10 ensures that the benchmark testings can be done in a laboratory environment ensuring that the different benchmark testings can be compared with each other in order to identify the best combination of operating system 24 and hardware components 22 with regard to the over-the-top behavior of the device under test 12.

Generally, the device under test 12 may be a mobile device typically used for over-the-top purposes such as a tablet, a notebook or a mobile phone.

Alternatively, the device under test 12 may be a television, a set-top box, a game console or any other suitable electronic device used for receiving and/or transmitting over-the-top content.

Due to the fact that the over-the-top traffic unit 26 is used during the benchmark testing, it is no more necessary to estimate the over-the-top behavior of the device under test 12 as it has been tested simultaneously and directly.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A test system for benchmark testing a device under test, said test system comprising:
   a device under test having hardware components, an operating system and at least one over-the-top traffic unit, said over-the-top traffic unit comprising at least one of an over-the-top traffic simulation component configured to simulate different over-the-top traffic applications in order to determine the over-the-top behavior of the device under test for different over-the-top traffic applications or an over-the-top traffic application generating traffic;
   at least one network unit configured to provide network for said benchmark testing; at least one control unit configured to control said benchmark testing; and at least one measurement unit configured to acquire benchmark data of said device under test, said control unit being configured to control said measurement unit and said over-the-top traffic unit,
   wherein the test system is configured to identify the optimal working combination of hardware components and operating system with regard to the over-the-top behavior of the device under test by using the over-the-top traffic unit;
   wherein said test system further comprises at least one indication unit being configured to provide results obtained during benchmark testing, and wherein said indication unit comprises a display that is configured to display over-the-top performance data, hardware performance data and/or operating system performance data.

2. The test system according to claim 1, wherein said over-the-top traffic unit is configured to interact with said operating system such that data is transmitted in a controlled manner.

3. The test system according to claim 1, wherein said network unit is configured to provide a wireless network.

4. The test system according to claim 1, wherein said network unit is connected to the internet.

5. The test system according to claim 1, wherein said network unit is a network simulation unit such that said network provided is a simulated one.

6. The test system according to claim 1, wherein said device under test is configured to be operated by another operating system such that the operating system is exchangeable.

7. The test system according to claim 1, wherein said hardware components are exchangeable.

8. The test system according to claim 1, wherein said test system comprises an analyzing unit being configured to analyze the benchmark data acquired by said measurement unit.

9. The test system according to claim 8, wherein said analyzing unit is configured to identify at least one of a separate traffic, a communication pattern or a communication pattern in one identified traffic.

10. The test system according to claim 1, wherein said benchmark data acquired comprise at least one of over-the-top performance data, hardware performance data or operating system performance data.

11. The test system according to claim 1, wherein said device under test is a mobile device.

12. The test system according to claim 1, wherein at least two of said network unit, said measurement unit and said control unit are established in a common device.

13. A method for benchmark testing a device under test, with the following steps:
providing a device under test having hardware components, an operating system and at least one over-the-top traffic unit, said over-the-top traffic unit comprising at least one of an over-the-top traffic simulation component or an over-the-top traffic application generating traffic: providing a network for said benchmark testing by using at least one network unit; controlling said over-the-top traffic unit and said network unit by using a control unit; and measuring benchmark data by using a measurement unit in order to identify the optimal working combination of hardware components and operating system with regard to the over-the-top behavior of the device under test by using the over-the-top traffic unit;
wherein said test system further comprises at least one indication unit being configured to provide results obtained during benchmark testing, and
wherein said indication unit comprises a display that is configured to display over-the-top performance data, hardware performance data and/or operating system performance data.

14. The method according to claim 13, wherein said network is simulated by said at least one network unit.

15. The method according to claim 13, wherein said benchmark data measured are analyzed by an analyzing unit that identifies at least one of separate traffic, communication pattern or communication pattern in one identified traffic.

16. The method according to claim 13, wherein results obtained during benchmark testing are provided, said results comprising at least one of over-the-top performance data, hardware performance data or operating system performance data.

17. The method according to claim 13, wherein several benchmark tests are performed using different test scenarios, said test scenarios being defined by adapting at least one of said operating system, said hardware components or said controlling of said over-the-top traffic unit.

* * * * *